United States Patent [19]

Zgambo

[11] Patent Number: 4,786,198

[45] Date of Patent: Nov. 22, 1988

[54] INK COMPOSITIONS AND WRITING INSTRUMENTS INCLUDING THE COMPOSITIONS

[75] Inventor: Thomas P. Zgambo, Weymouth, Mass.

[73] Assignee: The Gillette Company, Boston, Mass.

[21] Appl. No.: 106,201

[22] Filed: Oct. 8, 1987

Related U.S. Application Data

[63] Continuation-in-part of Ser. No. 812,681, Dec. 23, 1985, abandoned.

[51] Int. Cl.$^4$ .................. B43K 7/08; C09D 11/00
[52] U.S. Cl. .................... 401/142; 106/20; 106/22; 106/23; 106/25; 523/161
[58] Field of Search ............ 401/142, 141, 213; 106/20, 22, 23, 25, 30; 523/161

[56] References Cited

U.S. PATENT DOCUMENTS

| | | | |
|---|---|---|---|
| 3,526,522 | 9/1970 | Seregely | 106/270 |
| 3,656,857 | 4/1972 | Seregely | 106/270 |
| 4,666,519 | 5/1987 | Akiyama et al. | 106/22 |
| 4,671,691 | 6/1987 | Case et al. | 401/142 |
| 4,687,791 | 8/1987 | Miyajima et al. | 106/23 |
| 4,726,845 | 2/1988 | Thompson et al. | 106/25 |

FOREIGN PATENT DOCUMENTS

| | | |
|---|---|---|
| 5723463 | 8/1983 | Japan . |
| 2094820 | 3/1982 | United Kingdom . |
| 2131040 | 6/1984 | United Kingdom . |

*Primary Examiner*—Josephine Barr
*Attorney, Agent, or Firm*—John P. Morley

[57] ABSTRACT

Novel improved aqueous based, water-fast, shock resistant, shear-thinning ink compositions and ball-point pens including the ink compositions. The ink compositions comprise a substantially uniform dispersion of colorant(s), a water dispersible, polymeric shear-thinning material and a substantially water soluble polymeric binder material in a highly polar solvent system. On drying, the ink compositions provide a coalesced residue of binder and colorant(s) which is water-fast.

39 Claims, No Drawings

INK COMPOSITIONS AND WRITING INSTRUMENTS INCLUDING THE COMPOSITIONS

CROSS-REFERENCE TO RELATED APPLICATIONS

This application is a continuation-in-part of U.S. patent application Ser. No. 812,681 filed Dec. 23, 1985 now abandoned.

BACKGROUND OF THE INVENTION

1. The Field of the Invention

This invention relates to novel, improved ink compositions and to writing instruments including such ink compositions. More precisely, the invention disclosed herein relates to aqueous ink compositions including water dispersible, polymeric shear-thinning providing materials and to ball-point writing instruments including the ink compositions.

2. Description of the Prior Art

Ink compositions including water dispersible, polymeric, shear-thinning providing materials are disclosed in commonly assigned, copending application Ser. No. 693,930 filed Jan. 23, 1985 by Laura K. Case et al. Application Ser. No. 693,930 is expressly incorporated herein in its entirety by reference. Essentially, the ink compositions disclosed in application Ser. No. 693,930 are thickened, viscous liquids at rest. They are non-Newtonian liquids and may have a rheological yield value and exhibit shear-thinning flow behavior or shear-thinning flow characteristics in use. In other words, they become thin, readily flowable liquids having a viscosity of no greater than about 100 cPs at shear rates produced in writing such as with a ball point pen. The ink compositions include at least one water dispersible, L polymeric shear-thinning providing material uniformly dispersed in a highly polar solvent system which is preferably water or primarily water. Other materials such as coloring materials, surfactants, preservatives, corrosion inhibitors, humectants and the like can also be included in the inks.

The preferred shear-thinning inks of U.S. patent application Ser. No. 693,930 include polymeric shear-thinning providing materials (or shear-thinning materials) which are substantially water soluble. Accordingly on drying, the compositions provide a coalesced residue which is substantially water soluble and which exhibits a relatively low degree of water-fastness. Moreover, the shear-thinning inks have relatively high viscosities at low shear rates and, like other high viscosity inks, are susceptible or vulnerable to the effects of shock. Normally, the shear-thinning inks disclosed in U.S. application Ser. No. 693,930 are contained in hollow, non-pressurized tubes and fed directly to the ball of the writing instrument. However, when the ink is contained in a non-pressurized tube, the instrument should be handled carefully to avoid excessive shock. For example, if the instrument is dropped, tapped against a hard object or otherwise jarred, the column of ink in the tube may separate or be pulled or pushed away from the region of contact between the column of ink and the ball. This separation can result in a pocket of air being established between the ball and the column of ink which can affect the writing performance of the instrument until contact between the ink column and the ball is restored.

This invention is primarily directed to the problem of providing a shear-thinning ink having an improved degree of water-fastness. This invention is also addressed to the problems of controlling the effects of shock on high viscosity ink compositions and provides an especially effective solution to those problems.

BRIEF SUMMARY OF THE INVENTION

The novel, improved ink compositions of the present invention are aqueous based, water-fast, shock resistant, shear-thinning inks for writing instruments. The ink compositions exhibit non-Newtonian flow characteristics. They have a high viscosity at low shear rates and comprise a substantially uniform dispersion of colorant(s), a water dispersible, polymeric shear-thinning material and a substantially water soluble polymeric binder material in a polar solvent system. The colorant and water soluble binder materials are those which are substantially water insoluble when the ink composition is dry to thereby provide a colored, coalesced residue of colorant and binder which is water-fast (or permanent) when dry. Additionally, the water soluble binder materials are those which provide improved shock resistance for the ink composition. While the ink compositions have a high viscosity at low shear rates, they undergo shear-thinning and are readily flowable in response to shear rates produced in writing to provide a writing ink having an especially desirable combination of performance characteristics.

In the preferred writing instruments, the ink compositions are contained in hollow, non-pressurized or low pressurized tubes or reservoirs and the ink is fed directly to the writing ball of a ball point pen. In the especially preferred writing instruments, the ink is used in combination with a viscoelastic follower composition having specific rheological properties which insure a smooth, continuous flow of ink to the rotating ball as the ink supply is consumed.

DETAILED DESCRIPTION OF PREFERRED EMBODIMENTS

Essential ingredients of the ink compositions of the present invention are a water dispersible polymeric, shear-thinning material, a substantially water soluble polymeric material or binder, substantially water insoluble colorants and, a highly polar solvent system.

Polymeric shear-thinning materials suitable in the practice of the invention are those which can be dispersed in a highly polar solvent system to provide an ink having a shear-thinning index (n) of between about 0.01 to about 0.6 and most preferably between about 0.05 to about 0.3 or 0.4. For the purposes of this invention, the shear-thinning index (n) is calculated by fitting shear stress (T) and shear rate values ($\dot{y}$) obtained from rheological measurements on a viscometer such as a HAAKE ROTOVISCO, Haake Inc., Saddle Brook, N.J. to the empirical power law equation $T = K \dot{y}^n$ (where K and n are calculated L constants). Additionally the shear-thinning index is obtained by measurements of an aqueous solution of the shear-thinning material at shear rates between about 30 to about 300 sec$^{-1}$. Shear stress values are measured from the curve on the HAAKE ROTOVISCO at different shear rates (typically 30, 90, 150, 210 and 300 sec$^1$) and the measured shear stress values are fitted to the shear rates using a curve-fitting program.

Suitable polymeric shear-thinning materials provide inks which are thickened viscous liquids at rest or at low shear rates. For example, inks of the present invention have a viscosity of at least 50 cPs and usually about 100 cPs or higher at a shear rate of 30 sec$^{-1}$ However, in response to shear rates produced by writing, the inks undergo shear-thinning and have a viscosity of less than about 100 mPs at shear rates produced by writing. Accordingly, polymeric shear-thinning materials suitable in the practice of the invention are those providing a shear-thinning index (n) between about 0.01 to about 0.6, a viscosity of 50 cPs or greater at a shear rate of 30 sec$^{-1}$ and a viscosity of less than 100 mPs at shear rates produced by writing.

The polymeric shear-thinning materials of aqueous ink compositions of the present invention are the essential ingredients which provide the primary control over the rheological and/or thixotropic characteristics of the ink compositions. Other thickening materials may be used in combination with the shear-thinning material(s) if desired to provide ink compositions having selected performance characteristics. However, such other materials are not needed or required to achieve the essential rheological and/or thixotropic control function provided by the shear-thinning material(s).

Preferred polymeric shear-thinning materials additionally provide aqueous ink compositions which do not undergo a significant change in viscosity in response to temperature. For the purposes of this invention, "a significant change in viscosity in response to temperature" is a change of greater than about 50 percent in the viscosity measurement of the ink composition (at the same shear rate) over at least one segment of a successive temperature range of about 10° C. which is within the temperature range of from about 0° C. to about 60° C. Especially preferred shear-thinning materials are those which do not undergo any significant change in viscosity over a 10° C. temperature range segment within the temperature range between about 5° C. to about 35° C. In other words, especially preferred polymeric shear-thinning materials are those which provide aqueous ink compositions having the described shear thinning index and also provide ink compositions in which the change in viscosity measurement is not greater than about 50 percent between for example, 0° C.–10° C. or 10° C.–20° C. or 20° C.–30° C. or 25° C.–35° C., etc.

Especially preferred specific shear-thinning materials are L xanthan gum, carageenan gum, locust bean gum, hydroxyethylcellulose and guar gum. Xanthan gum is the particularly preferred shear-thinning material and preferred commercially available xanthan gums are sold by The Kelco Company under the trade names KELTROL and KELZAN.

The amount of polymeric shear-thinning material useful in the ink composition of the invention can vary. However, amounts of shear-thinning material between about 0.1 to about 5 or 6 percent by weight of the material based on the total weight of the composition are normally suitable. In the case of the preferred shear-thinning materials, amounts between about 0.5 to about 2.5 percent are normally suitable.

Polymeric binder materials used in the practice of the present invention are substantially soluble in water but become substantially water insoluble when the ink composition is dry. Essentially, the function assigned the binder material is to bind, hold or otherwise retain some of the colorant material which is also substantially water insoluble when the composition is dry to provide a dry, coalesced residue of polymeric material and colorant which is substantially water insoluble or water-fast. Additionally, the water soluble binder materials provide improved shock-resistance for the ink composition. The selection of a particular substantially water soluble binder material and the amount thereof for use in ink compositions can provide a dry, coalesced residue of binder material and colorant which is substantially water-fast and also does not adversely affect or otherwise impair the shear-thinning capability of the polymeric shear-thinning material of the ink composition. In other words, the ink composition will still provide a viscosity of no greater than about 100 cPs at shear rates produced by writing despite the addition of the polymeric binder material.

Preferred polymeric binder materials are those which are substantially water soluble when maintained at a given pH but become substantially water insoluble when not maintained at that pH. Especially preferred polymeric materials are polymers of monomers providing substituted or unsubstituted olefin acid radicals such as acryl or acrylyl radicals or derivatives of such radicals and where the polymeric chain is or can be made water soluble at one pH and water insoluble at another pH. Particular, especially preferred polymeric binder materials are acrylic copolymers having a degree of carboxyl functionality insufficient to be water soluble but sufficient to provide water solubility by interaction with a neutralizing agent in an amount sufficient to L provide a water soluble salt of the polymeric material. Normally, the degree of functionality is in the order of from about 3 to about 15 percent and the neutralizing agents used are volatile neutralizing agents such as ammonia or morpholine. In drying, the neutralizing agent volatilizes and the polymeric material provides a coalesced residue which is water resistant and substantially water insoluble. Especially preferred acrylic polymeric materials are sold under the trade names CARBOSET and CARBOPOL by B. F. Goodrich and JONCRYL Resins by Johnson Wax. These commercially available acrylic polymeric materials are thermoplastic polymers having acid numbers below about 50, weight average molecular weights between about 15,000 to about 200,000 and glass transition temperatures between about 20° C. to about 70° C. Commercially available acrylic polymers having acid numbers between about 25 30, molecular weights between about 25,000 to about 35,000, and, glass transition temperatures between about 25° to about 60° are particularly preferred.

The amount of water soluble polymeric binder material used in ink compositions of the invention can vary depending to a certain extent on the molecular weight of the binder material with amounts of higher molecular weight materials normally being less than lower molecular weight materials. Amounts of binder material between about 0.1 to about 30 percent by weight of the ink composition are normally suitable. Preferred amounts of the especially preferred binder materials mentioned before are between about 1 to about 20 percent by weight. An especially preferred ink composition includes from about 5 to about 15 percent by weight of the preferred binder materials and from about 0.5 to about 1.0 percent by weight of xanthan gum.

Ink compositions of this invention are aqueous based shear-thinning inks and include a polar solvent system in which water is the primary solvent for the polymeric shear-thinning material and the water soluble, polymeric shock resistant providing material. The polar solvent system may comprise from about 50 to about 99 percent by weight of the ink composition. While water is the primary or essential solvent of the solvent system, other polar solvents can be included in the solvent system in place of up to about 50 percent (or somewhat higher) by weight of the water in the solvent system. Preferred ink compositions of this invention are those having about 70 percent (or greater) by weight of water in the polar solvent system and, ink compositions of this invention can comprise polar solvent systems having 100 percent by weight water or substantially 100 percent by weight water. In short, water is the primary solvent of the polar solvent systems of inks of the present invention and, the use of any other particular polar solvent and the amount thereof used in combination with water is not an especially critical feature in ink compositions of this invention.

Other polar solvents which may be included in polar solvent systems of ink compositions of the invention are those which can function as hygroscopic wetting agents useful in reducing the ink drying rates and include dihydric alcohols such as ethylene glycol, diethylene glycol, triethylene glycol, 1,3-propanediol, propylene glycol, 1,3-butylene glycol, 1,4-butanediol, 2,3-butylene glycol, neopentyl glycol, hexylene glycol, thiodiglycol, and the like. Other polar-solvent wetting agents include tri- and L higher-hydric alcohols such as glycerin, trimethylolethane, trimethylolpropane, 3-methyl pentane-2,3,5-triol, diglycerin, sorbitol, pyrrolidone, N-methyl-2-pyrrolidone, dimethylformamide, urea, and the like. Preferred amounts of other polar solvents which may be included in the polar solvent system are between about 5 to about 20 percent by weight of the total weight of the polar solvent system.

Ink compositions of this invention advantageously include an organic solvent material capable of penetrating into the paper-writing surface to act as a drying agent and also to act as a levelling agent for the ink to produce smooth writing characteristics. The especially preferred drying and levelling function complex includes fluorinated polysilane surface active agents such as the product sold under the trademark LEVELENE 100 L (American Color & Chemical Corp.). These materials are normally used in amounts between about 0.01 to about 2.0 percent by weight and preferably between about 0.1 to about 1.0 percent.

The colorant materials employed in the ink composition of this invention are colorants which are substantially water insoluble when the ink composition is dry. Water insoluble pigments or mixtures of such pigments are preferred but water soluble or partially water soluble pigments or dyes may be used providing they become or are rendered substantially water insoluble when the ink composition is dry. Suitble colorants include but are not limited to Carbon black (PIGMENT BLACK 7), Phthalocyanine Blue (PIGMENT BLUE 15), Phthalocyanine Green (PIGMENT GREEN 7) and , Anthraquinoid Red (PIGMENT RED 177).

Ink compositions of the present invention can include, sequestering agents to maintain or improve stability. These sequesterants are normally added in the amount of 1-50% by weight of the shear-thinning providing materials. Examples of useful sequestering agents include sodium hexametaphosphate, trisodium phosphate, and sodium glucoheptanate, and tetrasodium EDTA.

Ink compositions of the present invention can also include preservatives to prevent the growth of microorganisms, yeast, and mold. Examples of such preservatives include methyl p-hydroxybenzoate, propyl p-hydroxybenzoate, DOWICIL 75 and 200 (active ingredient: 1-(3-chloroallyl)-3,5,7-triaza-1-azoniaadamantane chloride (Dow Chemical Co.). These biocides are typically present at 0.01-5% by weight of the ink.

When aqueous ink compositions of the invention are likely to come in contact with metals, corrosion inhibitors such as benzotriazole are often used. Such materials may constitute up to 5% by weight of the ink but are preferably used in amounts less than 0.5%.

The ink compositions of this invention are easily prepared by combining the desired ingredients in a blender or mixing with a propeller stirrer until homogeneity is achieved. Preferably the polymeric shear-thinning providing material is first added to distilled water and this combination mixed for about two hours. The other ingredients, if present, are added in the following order: other polar solvents, sequestering agents, preservatives, surfactants, corrosion inhibitors, and dyes and/or pigments. In some cases, it is advisable to pre-wet the water-dispersible gum with a humectant such as propylene glycol or glycerol. Generally, the amount of such humectant is 1 to 5 times by weight of the amount of water-soluble gum added. Preferably, the water soluble polymeric or binder material is added to the ink composition as the last ingredient and mixed or blended with the composition in a blender. The water soluble polymeric material is prepared by dispersing the water insoluble polymeric material in warm water and adding sufficient ammonia or morpholine to dissolve the polymeric material. Minor amounts of non-volatile neutralizing agents such as sodium or potassium hydroxide may be added if desired.

Typical preferred ink compositions in the practice of the invention are contained in illustrative Example I-III below.

EXAMPLE I

| Material | Weight % |
| --- | --- |
| Xanthan Gum | 1.00 |
| Acrylic Copolymer[1] | 8.00 |
| Carbon Black | 10.00 |
| Benzotriazole | 0.50 |
| Ethylene Glycol | 5.00 |
| Glycerol | 5.00 |
| EDTA (Tetrasodium) | 0.50 |
| Fluorinated polysilane surface active agent (LEVELENE 100, American Color and Chemical Co.) | 0.25 |
| Methyl Paracept (Biocide) | 0.50 |
| Water | 69.25 |

[1]The acrylic copolymer used was a commercially available acrylic copolymer sold under the trade name CARBOSET - 525 by B. F. Goodrich.

EXAMPLE II

| Material | Weight % |
| --- | --- |
| Xantham Gum | 0.80 |
| Acrylic Copolymer[2] | 10.00 |
| Carbon Black | 10.00 |
| Benzotriazole | 0.50 |
| Ethylene Glycol | 5.00 |
| Glycerol | 5.00 |
| EDTA (Tetrasodium) | 0.50 |
| Fluorinated polysilane surface active agent (LEVELENE 100, American Color and Chemical Co.) | 0.25 |
| Methyl Paracept | 0.50 |

-continued

| Material | Weight % |
|---|---|
| Water | 67.45 |

[2] The acrylic copolymer used was a commercially available acrylic copolymer cross-linked with alkyl ether sold under the trade name CARBOPOL by B. F. Goodrich.

EXAMPLE III

| Material | Weight % |
|---|---|
| Xantham Gum | 0.80 |
| Acrylic Copolymer[3] | 15.00 |
| Carbon Black | 10.00 |
| Benzotriazole | 0.50 |
| Ethylene Glycol | 5.00 |
| Glycerol | 5.00 |
| EDTA (Tetrasodium) | 0.50 |
| Fluorinated polysilane surface active agent (LEVELENE 100, American Color and Chemical Co.) | 0.25 |
| Methyl Paracept | 0.50 |
| Water | 62.45 |

[3] The acrylic copolymer used was a commercially available acrylic copolymer sold under the trade name CARBOSET XL 30 by B. F. Goodrich.

The ink composition of Examples I, II and III provide an excellent combination of desired writing performance characteristics. The writing is smooth and without excessive skipping, blotting, blobbing or leakage. The color of the writing line is dark and clear and has a smoothness and uniformity of color. More importantly, the ink compositions provide a writing line which is permanent. The line is both water and light fast and is extremely resistant to fading or smearing even when water is applied to the writing.

EXAMPLE IV

In order to demonstrate the improved shock-resistance of the water fast, shear-thinning inks of the present invention, a direct comparison of the shock resistance of the inks in Examples I, II and III and a Control shear-thinning ink are presented below. The composition of the Control shear-thinning ink was as follows:

| Material | Weight % |
|---|---|
| Xantham Gum | 1.00 |
| Carbon Black | 10.00 |
| Benzotriazole | 0.50 |
| Ethylene Glycol | 5.00 |
| Glycerol | 5.00 |
| EDTA (Tetrasodium) | 0.50 |
| Fluorinated polysilane surface active agent (LEVELENE 100, American Color and Chemical Co.) | 0.25 |
| Methyl Paracept | 0.50 |
| Water | 77.25 |

Each ink was included in the unpressurized reservoir of identical ball point pens (1.5 mls. ink in each reservoir) and the shock-resistant properties of each ink were determined in accordance with the following Tapping Test Procedure.

TAPPING TEST PROCEDURE

1. Handwrite 10 Johnson's.
2. Drop pen, point up, 10 times from a height of 1".
3. Immediately handwrite 10 Johnson's.
4. Store pen, point up, for 1 hour.
5. After 1 hour, handwrite 10 Johnson's.
6. Repeat 1-5 for 10 pens of each group.
7. Report % of 100 Johnson's from #3 which are acceptable (Score #3).
8. Report % of 100 Johnson's from #5 which are acceptable (Score #5).

The above Tapping Test Procedure involved apparatus designed to retain the pen in a vertical position and repeatedly drop or tap the retained pen from a controlled height of one inch ten times so that the shock force sustained in each drop is substantially constant for each pen tested.

Table A below summarizes the shock-resistant properties of the tested inks.

TABLE A

| Score | Example I | Example II | Example III | Control |
|---|---|---|---|---|
| #3 | 99 percent | 97 percent | 98 percent | 59 percent |
| #5 | 100 percent | 99 percent | 100 percent | 70 percent |

Score #3 and Score #5 of Table A represent the percentage derived from an examination of 100 writings of the word "Johnson" with each of the inks tested. The word "Johnson" has been selected since it is considered to be the best written word to evaluate the propensity of an ink which has been subjected to shock to skip or display starving which are characteristics evidencing the effects of shock. In the examination of the 100 writings, a score of 1 percentage point is given to each "Johnson" which has no observable skip or starved areas. No percentage point is given to a "Johnson" providing a skip or starved area. Score #3 generally reflects the immediate effect of back shock on an ink while Score #5 reflects longer term effects of shock. As can be seen from Table A, the writings of the inks of the present invention did not present significant skip or starved areas after the inks had been subjected to shock. However, the writings of the Control ink did evidence to significant effects of shock especially in both Score #3 and Score #5.

The reservoirs of the pens tested in Example IV included a viscoelastic follower composition which comprised mineral oil, polybutene and clay (BENTONE 34). The preferred viscoelastic follower compositions for use in combination with the shock-resistant shear-thinning inks of the present invention are described in detail in U.S. patent application Ser. No. 693,930 already incorporated by reference. Essentially the preferred viscoelastic follower compositions comprise from about 5 to about 99 percent by weight of the composition of mineral oil, from about 5 to about 99 percent by weight polybutene and from about 0.1 to about 10 percent by weight of an organophilic clay. The relative proportions of the above ingredients are selected so that the resultant follower composition exhibits increasing tan delta values over the shear rate range of 5 to 30,000 sec$^1$ and also exhibit tan delta values of less than about 1 at shear rates up to 50 sec$^1$.

Writing instruments of the present invention include structural elements common to conventional and commercially available ball-point writing instruments. Essentially, these elements include a body retaining an ink reservoir, means for delivery of the ink to a socket located at one end of the instrument and a rotatable point retained in the socket and adapted to apply ink delivered to the socket to a surface to provide visible markings on the surface. As mentioned, the especially preferred instruments or pens include a viscoelastic follower of the type described above in the reservoir.

From the above description it is apparent that the novel, improved shear-thinning inks of the present invention provide significant and unexpected advantages. They have high viscosities at low shear rates and accordingly do not present leakage problems in writing instruments such as roller ball writing instruments. However, when subjected to shear rates such as are produced in writing, the inks undergo shear-thinning and are readily flowable to provide writing of excellent quality and performance characteristics. Additionally the shear-thinning inks provide a permanent writing line which is water fast and extremely resistant to fading and the inks exhibit improved shock resistance. Accordingly, the invention presents to the art water fast, shock-resistant, shear-thinning inks which present an idealized combination of desired performance characteristics and which are unexpectedly different from shear-thinning inks known to the art at the time this invention was made.

I claim:

1. A water-fast, shock resistant shear-thinning ink composition consisting essentially of:
   a. from about 50 to about 99 percent by weight of a polar solvent system including at least about 50 percent by weight water,
   b. an effective amount of colorant material which is water insoluble when the composition is dry,
   c. an amount of a water dispersible, polymeric shear-thinning material sufficient to provide an ink having a shear-thinning index between about 0.01 to about 0.6, a viscosity of 50 cPs or greater at a shear rate of 30 sec$^{-1}$ and a viscosity of 100 cPs or less at shear rates produced by writing, and
   d. a water soluble polymeric binder material which is effective to improve the shock resistance of the composition and is water insoluble when the composition is dry in an amount ineffective to substantially affect the shear-thinning capability of the polymeric shear-thinning material, said composition providing a colored, water insoluble coalesced residue on drying.

2. A composition of claim 1 where the viscosity at a shear rate of 30 sec$^{-1}$ is 100 cPs or greater.

3. A composition of claim 1 where the shear thinning index is between about 0.05 to about 0.30.

4. A composition of claim 1 where the shear-thinning material is present in an amount between about 0.1 to about 5 percent by weight.

5. A composition of claim 1 where the shear-thinning material comprises xanthan gum or carageenan gum or locust bean gum or hydroxyethylcellulose or guar gum or mixtures of these.

6. A composition of claim 1 where the binder material is present in an amount from about 0.1 to about 30.0 percent by weight.

7. A composition of claim 1 where the binder material is present in an amount from about 1 to about 20 percent by weight.

8. A composition of claim 1 where the binder material is water soluble when maintained at a given pH range and water insoluble when not maintained at that range.

9. A composition of claim 8 where the shear-thinning providing material is xanthan gum.

10. A composition of claim 8 where the binder material is an acrylic polymer having a carboxyl functionality between about 3 to about 15 percent.

11. A composition of claim 1 where the composition includes from about 5 to about 15 percent by weight of binder material and from about 0.5 to about 1.0 percent by weight xanthan gum.

12. A composition of claim 1 where the polar solvent system comprises a minor proportion of a polar solvent other than water.

13. A composition of claim 1 where the polar solvent system includes glycerol, ethylene glycol, propylene glycol or mixtures of these.

14. A composition of claim 1 including a drying and levelling agent.

15. A composition of claim 1 including a drying and levelling agent which is a fluorinated polysilane surface active agent.

16. A water-fast, shock resistant, shear-thinning ink composition having a shear-thinning index between about 0.01 to about 0.60, a viscosity of 50 cPs or greater at a shear rate of 30 sec$^{-1}$ and a viscosity of 100 cPs or less at shear rates produced by writing and consisting essentially of:
   a. from about 50 to about 99 percent by weight of a polar solvent system including at least about 50 percent by weight water,
   b. an effective amount of a colorant material which is water insoluble when the composition is dry,
   c. from about 0.1 to about 5 percent by weight of a polymeric, shear-thinning material selected from the group consisting of xanthan gum, carageenan gum, locust bean gum, hydroxyethylcellulose, guar gum or mixtures of these, and
   d. from about 1 to about 20 percent by weight of a binder material which is water soluble when maintained at a given pH range and water insoluble when not maintained at that pH range and which is effective to improve the shock resistance of the composition, said composition providing a colored, water insoluble coalesced residue on drying.

17. A composition of claim 16 where the viscosity at 30 sec$^{-1}$ is 100 cPs or greater.

18. A composition of claim 16 where the binder material is an acrylic polymer having a carboxyl functionality between about 3 to about 15 percent.

19. A composition of claim 18 where the shear-thinning material is xanthan gum.

20. A ball point pen comprising a reservoir including a water-fast, shock resistant, shear-thinning ink composition consisting essentially of:
   a. from about 50 to about 99 percent by weight of a polar solvent system including at least about 50 percent by weight water,
   b. an effective amount of colorant material which is water insoluble when the composition is dry,
   c. an amount of a water dispersible, polymeric shear-thinning material sufficient to provide an ink having a shear-thinning index between about 0.01 to about 0.6, a viscosity of 50 cPs or greater at a shear rate of 30 sec$^{-1}$ and a viscosity of 100 cPs or less at shear rates produced by writing, and
   d. a water soluble polymeric binder material which is effective to improve the shock resistance of the composition and is water insoluble when the composition is dry in an amount ineffective to substantially affect the shear-thinning capability of the polymeric shear-thinning material, said composition providing a colored, water insoluble coalesced residue on drying.

21. A ball-point pen of claim 20 where the viscosity at a shear rate of 30 sec$^{-1}$ is 100 cPs or greater.

22. A ball-point pen of claim 20 where the shear-thinning index is between about 0.05 to about 0.30.

23. A ball-point pen of claim 20 where the shear-thinning material is present in an amount between about 0.1 to about 5 percent by weight.

24. A ball-point pen of claim 20 where the shear-thinning material comprises xanthan gum or carageenan gum or locust bean gum or hydroxyethylcellulose or guar gum or mixtures of these.

25. A ball-point pen of claim 20 where the binder material is present in an amount from about 0.1 to about 30 percent by weight.

26. A ball-point pen of claim 20 where the binder material is present in an amount from about 1 to about 20 percent by weight.

27. A ball-point pen of claim 20 where the binder material is water soluble when maintained at a given pH range and water insoluble when not maintained at that range.

28. A ball-point pen of claim 27 where the binder material is an acrylic polymer having a carboxyl functionality between about 3 to about 15 percent.

29. A ball-point pen of claim 28 where the shear-thinning providing material is xanthan gum.

30. A writing instrument of claim 20 where the composition includes from about 5 to about 15 percent by weight of binder material and from about 0.5 to about 1 percent by weight xanthan gum.

31. A writing instrument of claim 20 where the polar solvent system comprises a minor proportion of a polar solvent other than water.

32. A writing instrument of claim 20 where the polar solvent system includes glycerol, ethylene glycol, propylene glycol or mixtures of these.

33. A writing instrument of claim 20 including a drying and levelling agent.

34. A writing instrument of claim 20 including a drying and levelling agent which is a fluorinated polysilane surface active agent.

35. A writing instrument of claim 20 where a viscoelastic ink follower is included in the reservoir.

36. A ball-point pen comprising a reservoir including a water-fast, shock resistant, shear-thinning ink composition having L a shear-thinning index between about 0.01 to about 0.60, a viscosity of 50 cPs or greater at a shear rate of 30 sec$^{-1}$ and a viscosity of 100 cPs or less at shear rates produced by writing and consisting essentially of:
   a. from about 50 to about 99 percent by weight of a polar solvent system including at least about 50 percent by weight water,
   b. an effective amount of a colorant material which is water insoluble when the composition is dry,
   c. from about 0.1 to about 5 percent by weight of a polymeric, shear-thinning material selected from the group consisting of xanthan gum, carageenan gum, locust bean gum, hydroxyethylcellulose, guar gum or mixtures of these, and
   d. from about 1 to about 20 percent by weight of a binder material which is water soluble when maintained at a given pH range and water insoluble when not maintained at that pH range and which is effective to improve the shock resistance of the composition, said composition providing a colored, water insoluble coalesced residue on drying.

37. A ball-point pen of claim 36 where the viscosity at a shear rate of 30 sec$^{-1}$ is 100 cPs or greater.

38. A ball-point pen of claim 36 where the binder material is an acrylic polymer having a carboxyl functionality between about 3 to about 15 percent.

39. A ball-point pen of claim 36 where a viscoelastic ink follower is included in the reservoir.

* * * * *